March 30, 1943. P. KLEIN 2,314,884
CONNECTOR
Filed May 1, 1940
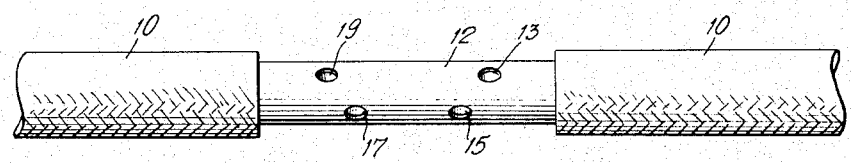
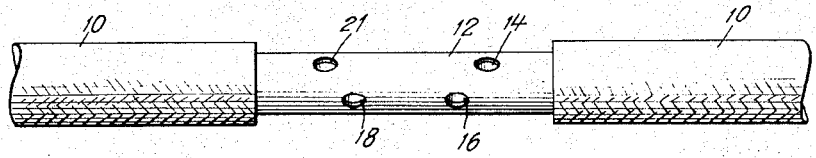
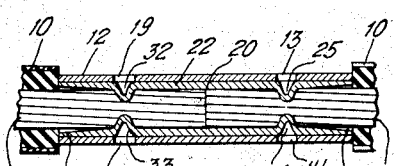 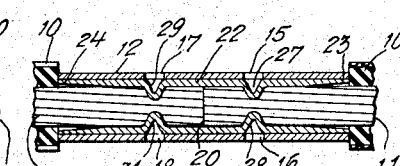 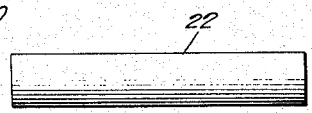
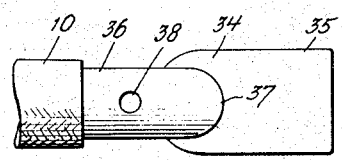 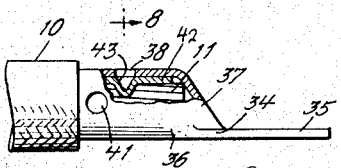 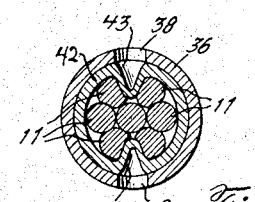
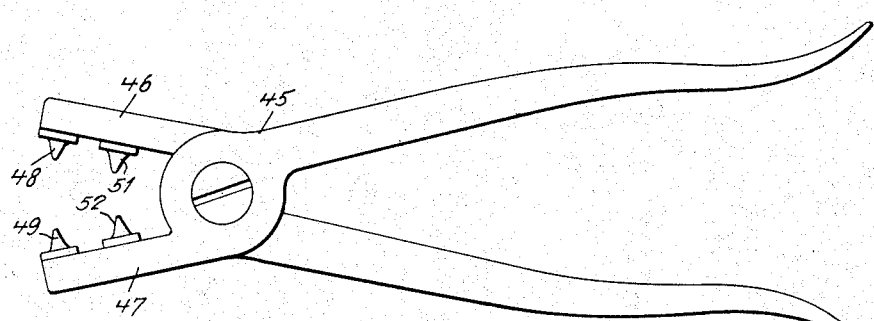
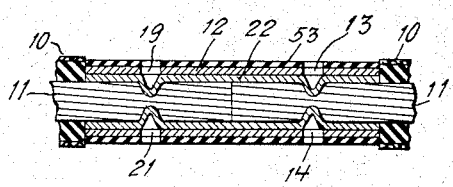
INVENTOR.
Peter Klein
BY Benjamin Webster
Attorney Patented Mar. 30, 1943

2,314,884

UNITED STATES PATENT OFFICE 2,314,884

CONNECTOR

Peter Klein, Brooklyn, N. Y.

Application May 1, 1940, Serial No. 332,716

9 Claims. (Cl. 174—84)

This invention relates to connectors for electric cables wherein the conductor proper in the ends to be connected is of the same size and is usually formed of a plurality of strands of copper wire twisted together and surrounded by insulation, such conductors being used especially underground, indoors, and in transformers.

Among the objects of the invention are to provide a connector: having a tubular connecting sleeve in which the joint may be made in a small space; that produces a small splice; that eliminates the fire hazard arising from the use of the gasoline torch, molten solder, and the soldering iron and pot; and that may be quickly and facilely made.

In a preferred form the invention comprises two tubes of substantially the same length, one fitting within the other, which may be of copper 99.9% pure and having a conductivity of 98%, the outer tube being extra hard to give strength and rigidity and the inner tube being dead soft, ductile and pliable. The inner tube is belled at both ends for a distance of ⅜ inch on tubes approximately 1½ inch length on a chamfer of 3 degrees in order to prevent the inner tube from slipping in the outer tube and to permit the ends of the wire or cable, after stripping off the insulation, to be inserted with ease. The conductivity of the connector must equal or exceed the conductivity of the wire or cable. The outer tube has eight holes formed in diametrically opposed pairs, four holes to the right and four holes to the left of the center, or in other words two pairs of diametrically disposed holes on each side, the pairs on each side being different distances from the end of the tube and disposed one pair lying in a diameter at right angles to that of the other pair. The outer wall of the inner tube is a solid cylinder.

A special pair of pliers is used to complete the splice, having oppositely disposed prongs on the inside of the jaws which swing toward each other in the same arc; these hard prongs may have a general conical form, but be rounded at the ends, and with the bases of the cones snugly fitting the opposite holes of a pair. Other shapes of holes and prongs are effective. Two pairs of prongs may be provided on the jaws, one for large sized connector tubes and the other pair for small sizes. The pairs of holes in the outer tube position and guide the prongs and the hardness of the outer tube is such as to maintain the form of the holes.

When the pliers are squeezed with the hand, the soft copper of the inner tube is pressed inward by the prongs into the wiring of the conductor to form indentations and to force the strands of a multiple wiring cable apart and against the inner wall of the inner tube, thereby providing a strong wedge and friction grip; the succeeding operation in the pair of holes at right angles on the same end not only adds another wedging and friction grip but forms a twist grip so that the total grip resulting far exceeds the factor of safety required.

The outer tube of the connector may be insulated by taping the outside in the usual manner between the insulation of the jointed wiring or cable, but I provide an insulating tube with holes similar to those of the outer conducting tube, either as a substitute for the outer tube or as a covering for the outer tube and coextensive therewith.

As applied to a compression-type lug as a terminal connector only two pairs of diametrically opposed holes in the outer shell are required spaced apart lengthwise and at right angles to each other.

Reference is made to the drawing in which

Figure 1 is a top view.

Figure 2 is a bottom view.

Figure 3 is a lengthwise diametrical section thru the outer holes shown in Figures 1 and 2.

Figure 4 is a lengthwise diametrical section thru the inner holes shown in Figures 1 and 2.

Figure 5 is a side view of the inner tube before splicing or locking the ends of the wiring in the connector.

Figure 6 is a top view of a compression type lug connector.

Figure 7 is a side view of Figure 6 but partly in section.

Figure 8 is a section on the line 8—8 of Figure 7, and is also a transverse section thru any pair of holes in Figures 3 and 4.

Figure 9 is a plan view of the pliers used in splicing or locking the connector.

Figure 10 is a view similar to Figure 3 but including an outside insulating tube over the connector.

An insulated cable 10 contains a plurality of bare copper wires 11 twisted together to form an electrical conductor, the insulation being cut away at the ends to expose the wires to be joined together end to end. As shown in Figures 1 to 5, inclusive, the connector comprises two interfitting cylindrical copper tubes. The outer cylindrical tube 12 is formed of hard copper to resist deformation and has four pairs of diametrically opposed apertures, 13, 14 and 15, 16 on the right side spaced apart lengthwise and with the diameters of the pairs substantially at right angles to each other. The inner cylindrical tube 22 is formed of dead soft copper and is chamfered at the right end 23 and at the left end 24 to facilitate the insertion of the strands 11 from opposite ends to meet substantially at the center 20 of the connector, and which are locked against withdrawal by indentations 25, 26 and 27, 28 on the right side and 29, 31 and 32, 33 on the left side, one of the indentations being disposed under each of the apertures in the tube 12.

Referring to Figures 6, 7, and 8 a compression type terminal lug 34 has a flat extension 35 and an outer cylindrical tube 36 of hard copper having a closed inner end 37 connected with the extension 35, diametrically opposed top and bottom apertures 38 and 39, and a side aperture 41 at right angles to the diameter thru the apertures 38 and 39, set further in from the end 37, and diametrically opposed to a similar aperture on the opposite side (not shown). The inner tube 42 may be of dead soft copper and fits snugly within the outer tube 36 and may be chamfered at the outer end to facilitate the insertion of the electrical wires 11. Hard prongs may be inserted thru the apertures 38 and 39 to form indentations 43 and 44 projecting inwardly from the inner wall of the inner tube 42 to tightly grip the electrical wires 11. Similarly indentations may be formed at right angles thru the side aperture 41 and the opposed side aperture (not shown).

Referring to Figure 9, a pair of pliers 45 has on the inner walls of jaws 46 and 47 specially formed hard prongs 48 and 49 at the ends of the jaws for connectors of large diameter, and prongs 51 and 52 inside for connectors of small diameter. Opposed prongs are inserted, for example, in the apertures 15 and 16 and manual pressure is applied to the pliers 45 to form the indentations 27 and 28.

In Figure 10 is shown an outer tube 53 formed of insulating material and apertured similarly to the underlying extra hard copper tube 12. In some connectors the hard tube 12 may be omitted where the strength of the insulating tube 53 is sufficient. In either case the tube 53 may serve as a substitute for the insulating tape usually applied over the splicing between the ends of the insulation on the cable 10.

The splicing operation is both quick and easy. The copper wiring 11 is bared by removing the insulation for approximately equal distances from the ends to be connected, and these ends are inserted in the ends of a tube approximately 2 inches in length from opposite ends, the edges of the cut insulation forming centering stops; the pliers 45 are applied to diametrically opposed apertures and pressed to form locking indentations which tightly wedge and twist the wires against removal from the connector. The operation is similar when the wires 11 are connected to a lug 34.

Having disclosed my invention and realizing that, in view of my disclosure, many substitutions of parts, omissions of parts, changes in material, changes in form, and changes in size will readily occur to those skilled in the art, I do not limit myself to the exact disclosure herein.

I claim:

1. A connector for cut electrical conductors comprising a plurality of wires, said connector comprising in combination two cylindrical, concentric and substantially co-extensive tubes, the inner tube being unitary and being formed of electrically conducting metal sufficiently soft to be ductile under manually applied pressure and having conical indentations formed therein and projecting inwardly for engagement between separate wires of said conductors respectively, whereby said wires are deflected circumferentially and twisted partially around said indentations, and the outer tube being unitary and being formed of relatively hard metal and being provided with apertures for the insertion of a prong to produce said indentations of said inner tube.

2. A connector for cut electrical conductors comprising a plurality of wires, said connector comprising in combination two cylindrical, concentric and substantially co-extensive electrically conducting metallic tubes, the inner tube being unitary and being sufficiently soft to be ductile under manually applied pressure and having conical indentations formed therein and projecting inwardly for engagement between separate wires of said conductors respectively, whereby said wires are deflected circumferentially and twisted partially around said indentations, and the outer tube being unitary and being relatively stiff and hard and being provided with apertures for the insertion of a prong to produce said indentations of said inner tube, the combined electrical conductivity of the tubes being substantially equal to that of the enclosed wiring.

3. A connector for cut electrical conductors comprising a plurality of wires, said connector comprising in combination two cylindrical, concentric and substantially co-extensive tubes, the inner tube being unitary and being formed of dead soft copper ductile under manually applied pressure and having conical indentations formed therein and projecting inwardly for engagement between separate wires of said conductors respectively, whereby said wires are deflected circumferentially and twisted partially around said indentations, and the outer tube being unitary and being formed of hard copper and being provided with apertures for the insertion of a prong to produce said indentations of said inner tube.

4. A construction as defined in claim 1, in which a plurality of said indentations engage each of said conductors, at points spaced from each other longitudinally and circumferentially from each other.

5. The combination with a pair of electrical conductors, each comprising a plurality of wires, of means for connecting cut ends of said conductors, comprising two cylindrical, concentric and substantially co-extensive tubes, the inner tube being unitary and being formed of electrically conducting metal sufficiently soft to be ductile under manually applied pressure and having conical indentations formed therein and projecting inwardly between separate wires of said conductors respectively, whereby said wires are deflected circumferentially and twisted partially around said indentations, and the outer tube being formed of relatively hard metal and being provided with apertures for the insertion of a prong to produce said indentations of said inner tube.

6. The combination with a pair of electrical conductors, each comprising a plurality of wires, of means for connecting cut ends of said conductors, comprising two cylindrical, concentric and substantially co-extensive electrically conducting metallic tubes, the inner tube being unitary and being sufficiently soft to be ductile under manually applied pressure and having conical indentations formed therein and projecting inwardly between separate wires of said conductors respectively, whereby said wires are deflected circumferentially and twisted partially around said indentations, and the outer tube being relatively stiff and hard and being provided with apertures for the insertion of a prong to produce said indentations of said inner tube, the combined electrical conductivity of the tubes being substantially equal to that of the enclosed wiring.

7. The combination with a pair of electrical conductors, each comprising a plurality of wires, of means for connecting cut ends of said conductors, comprising two cylindrical, concentric and substantially co-extensive tubes, the inner tube being unitary and being formed of dead soft copper ductile under manually applied pressure and having conical indentations formed therein and projecting inwardly between separate wires of said conductors respectively, whereby said wires are deflected circumferentially and twisted partially around said indentations, and the outer tube being formed of hard copper and being provided with apertures for the insertion of a prong to produce said indentations of said inner tube.

8. The combination with a pair of electrical conductors, each comprising a plurality of wires spirally arranged, of means for connecting cut ends of said conductors, comprising two cylindrical, concentric and substantially co-extensive tubes, the inner tube being unitary and being formed of dead soft copper ductile under manually applied pressure and having conical indentations formed therein and projecting inwardly between separate wires of said conductors respectively, whereby said wires are deflected circumferentially and twisted between and partially around said indentations, and the outer tube being formed of hard copper and being provided with apertures for the insertion of a prong to produce said indentations of said inner tube.

9. A construction as defined in claim 8, in which a plurality of said indentations engage each of said conductors, at points spaced from each other longitudinally and circumferentially from each other.

PETER KLEIN.